United States Patent
Hummell et al.

(10) Patent No.: US 6,534,142 B1
(45) Date of Patent: Mar. 18, 2003

(54) LABEL FOR NON-CIRCULAR OPTICAL DISCS

(75) Inventors: Michael Hummell, Newport Beach, CA (US); Joseph Sandor, Corona Del Mar, CA (US)

(73) Assignee: Avery Dennison Corporate Center, Pasadena, CA (US)

( * ) Notice: Subject to any disclaimer, the term of this patent is extended or adjusted under 35 U.S.C. 154(b) by 0 days.

(21) Appl. No.: 09/687,649

(22) Filed: Oct. 13, 2000

(51) Int. Cl.$^7$ ................................................. B32B 9/04
(52) U.S. Cl. .................... 428/40.1; 428/42.3; 428/66.6; 428/66.7; 428/80; 428/192; 428/343; 283/72; 283/83; 283/100; 283/101; 40/299.01; 369/282; 369/283; 369/286; 369/291
(58) Field of Search ..................... 428/40.1, 42.2–42.3, 428/80, 192, 64.1, 66.6, 66.7, 66.5, 343, 354; 283/81, 72, 100–101; 369/283, 291, 286; 40/299.01

(56) References Cited

U.S. PATENT DOCUMENTS

| | | | |
|---|---|---|---|
| 1,434,005 A | 10/1922 | Gulyban | |
| 4,124,118 A | * 11/1978 | Helm | 206/310 |
| 4,812,633 A | 3/1989 | Vogelgesang et al. | 235/487 |
| 4,903,255 A | * 2/1990 | Sugaya et al. | 369/284 |
| 5,493,105 A | 2/1996 | Desai | 235/375 |
| 5,579,296 A | 11/1996 | Smith et al. | 369/273 |
| 5,770,289 A | 6/1998 | Tracy | 428/40.1 |
| 5,925,200 A | 7/1999 | Grossman | 156/60 |
| 5,951,819 A | * 9/1999 | Hummell et al. | 156/556 |
| 5,958,177 A | * 9/1999 | Claussnitzer | 156/391 |
| 5,982,736 A | * 11/1999 | Pierson | 369/273 |
| D418,502 S | 1/2000 | Friday | D14/121 |
| D419,152 S | 1/2000 | Lowenstein | D14/121 |
| 6,016,298 A | 1/2000 | Fischer | 369/75.1 |
| D421,427 S | 3/2000 | Siegel | D14/114 |
| D429,733 S | 8/2000 | Jones et al. | D14/479 |
| D435,853 S | 1/2001 | Mehta et al. | D14/478 |
| D436,991 S | 1/2001 | Morgante | D19/9 |
| 6,279,960 B1 | * 8/2001 | Claussnitzer | 283/81 |
| 6,315,021 B1 | * 11/2001 | Lee et al. | 156/391 |
| 6,321,811 B1 | * 11/2001 | Atkinson et al. | 156/391 |
| 6,408,918 B1 | * 6/2002 | Hummell et al. | 156/391 |

FOREIGN PATENT DOCUMENTS

| | | | | |
|---|---|---|---|---|
| DE | 297 09 648 U1 | 6/1997 | ......... | B42D/15/10 |
| DE | 298 80 028 U1 | 10/1998 | ......... | G11B/7/24 |
| DE | 298 23 716 U1 | 2/2000 | ......... | G11B/7/24 |
| EP | 1004116 A1 | 2/1999 | ......... | G11B/7/24 |
| EP | 0990220 A1 | 1/2000 | ......... | G06K/19/04 |
| FR | 2782187 A1 | 2/2000 | ......... | G11B/25/04 |
| GB | 2331959 A | 6/1999 | ......... | G06K/19/04 |
| JP | 4040586 A | 2/1992 | ......... | G06K/19/06 |
| JP | 5151570 A | 6/1993 | | |
| JP | 10269628 A | 10/1998 | ......... | G11B/7/24 |
| WO | PCT/DE98/02394 | 2/1999 | ......... | G11B/7/24 |
| WO | PCT/DE99/01582 | 12/1999 | ......... | G06K/19/08 |
| WO | PCT/FR98/01880 | 2/2000 | ......... | G11B/25/04 |

* cited by examiner

Primary Examiner—Harold Pyon
Assistant Examiner—Brian P. Egan
(74) Attorney, Agent, or Firm—Walter A. Hackler

(57) ABSTRACT

A label for an optical disc having a non-circular perimeter includes a sheet having a non-circular having a non-circular perimeter and a central aperture disposed in a sheet which has a perimeter for enabling registration of a label with an optical disc in order to provide for balanced rotation of the optical disc in order to provided for balanced rotation of the optical disc with the label fixed thereto. The sheet may be provided with an adhesive for fixing a sheet to the optical disc.

19 Claims, 5 Drawing Sheets

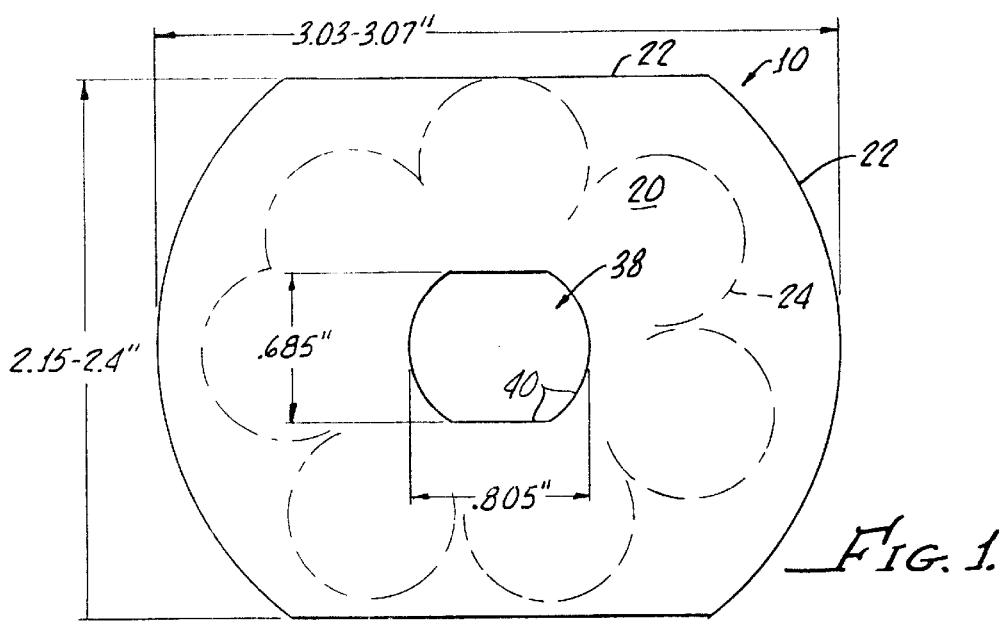
_Fig. 1._
_Fig. 2._
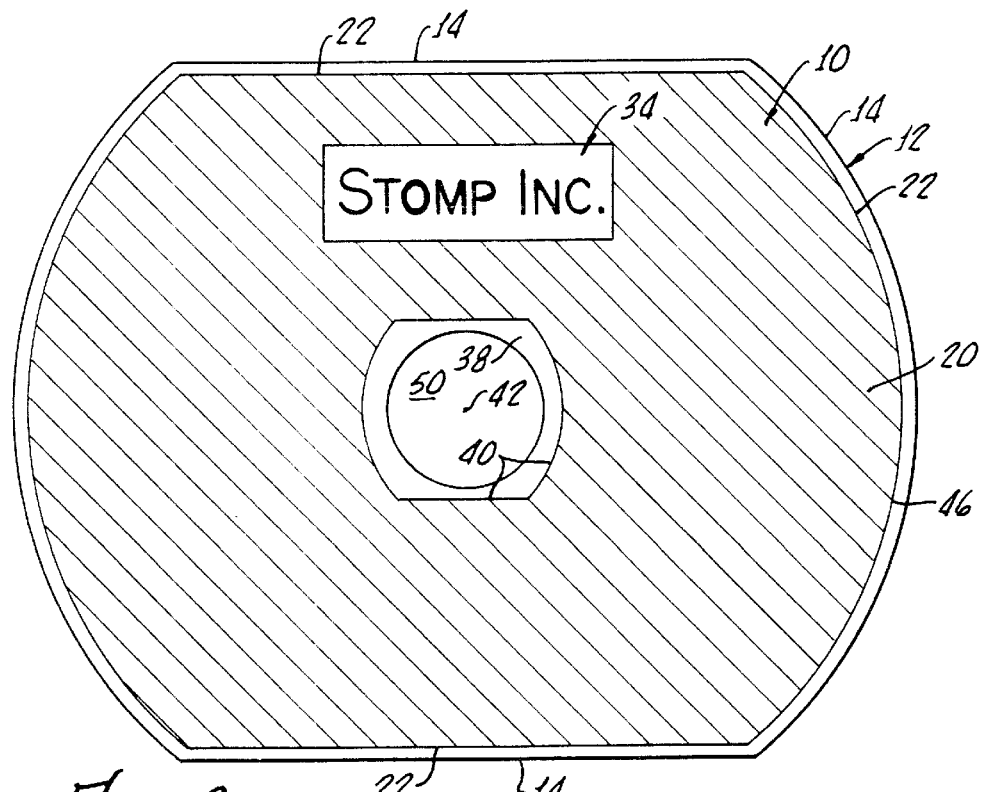
_Fig. 3._

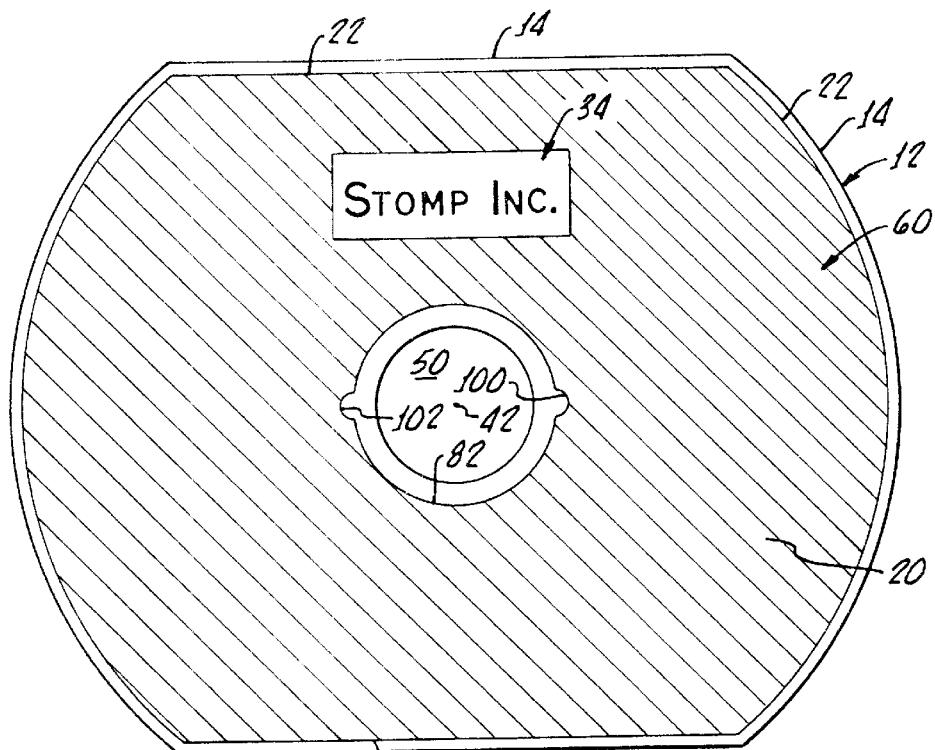
_Fig. 4._
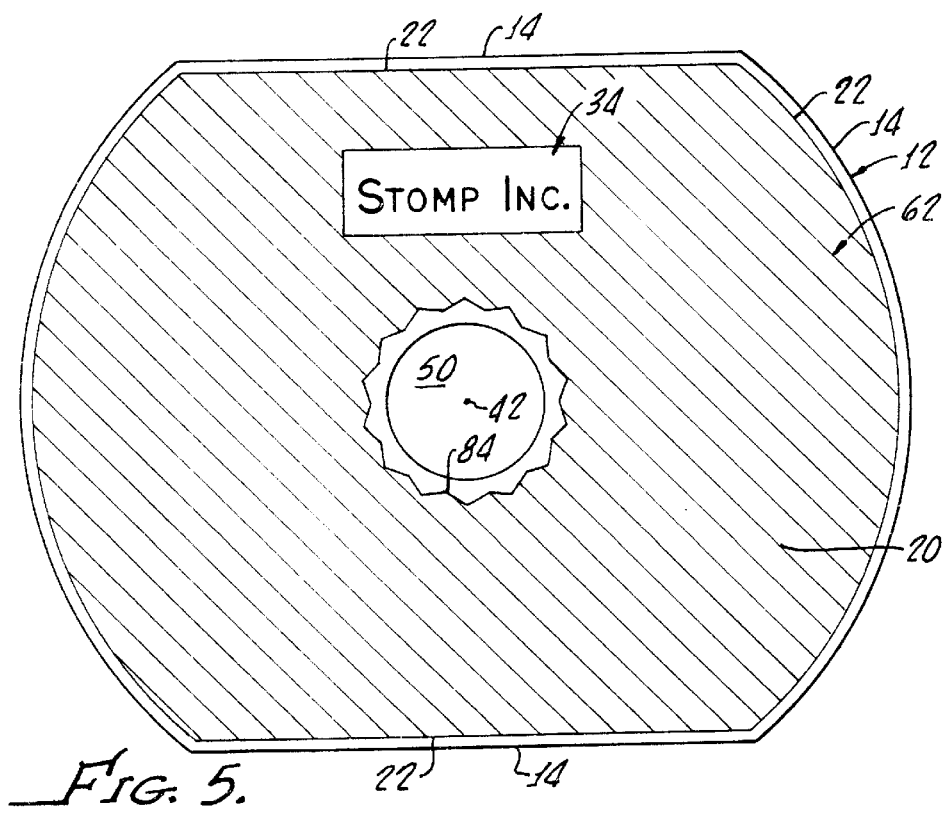
_Fig. 5._

LABEL FOR NON-CIRCULAR OPTICAL DISCS

FIELD OF THE INVENTION

The present invention generally relates to the field of labels for optical discs, and more particularly relates to labels for non-circular optical discs.

BACKGROUND OF THE INVENTION

Optical discs such as laser discs, mini discs, CDE discs, DVD discs, CDs and CD-ROMs have proliferated in recent years, due to their versatility as a storage medium for digital information. The underside of these optical discs are encoded with optical readable signals in digital format. Most recently, a trend has developed towards the manufacture and use of optical discs that are non-circular in shape. These non-circular optical discs can be manufactured as CD-recordable business cards or other fanciful shapes.

The CD-recordable business card (hereinafter "business card CD-R") is shaped with rounded ends, and interconnecting straight sides, and is sized for accommodation in a wallet alongside traditional, paper business cards. The business card CD-R provides a convenient, compact medium for carrying digital documentation such as curriculum vitae, brochures, portfolios or and other information up to between about 20 megabytes and about 50 megabytes.

It is also possible to manufacture other non-circular optical discs, provided that the disc is designed such that the disc's center of gravity is located at the center of the optical disc, to provide balanced rotation around a hub. Preferably, the optical disc is symmetrical, in a plane of revolution in order to ensure balanced rotation, which, in turn, is important for optimally recording or reading the disc by an appropriate device.

With the advent of the business card CD-R, a need has arisen for labeling the business card CD-R. As with circular optical discs that are currently on the market, labels provide the user with a means of identifying the contents of the disc. Circular optical discs have corresponding self-adhesive labels that can be written on, or printed on by ink-jet or laser printer, and then applied to the disc with the aid of various label applicators.

The self-adhesive labels that are currently on the market for optical discs function poorly in relation to the business mini disc however, because these traditional circular labels must be trimmed to conform with the shape of non-circular optical discs, such as the business card CD-R. Trimming each label individually is cumbersome and imprecise, and can provide labels that unbalance the disc during reading or recording.

Alternatively, self-adhesive labels can be manufactured on a mass scale that are specifically sized in conformance with the non-circular optical discs, including labels for the business card CD-R. The precut label presents additional problems however, in that the non-circular shape requires precise alignment against the non-circular disc. As a result, a non-circular label has a limited number of positions that provide alignment with the non-circular disc. Current label applicators, as based on designs from U.S. Pat. No. 5,782,033, U.S. Pat. No. 5,925,200, U.S. Pat. No. 5,902,446, cannot provide any alignment of non-circular discs and their labels, since these label applicators are designed for circular labels and discs which can be rotated to any degree to obtain alignment.

SUMMARY OF THE INVENTION

A label for an optical disc having a circular perimeter in accordance with the present invention generally includes a sheet having a non-circular perimeter and adhesive for fixing the sheet to the optical disc. Preferably, the adhesive is disposed on one side of the sheet.

A label central aperture is provided which has a perimeter for enabling registration of the label with the optical disc. The label central aperture can be considered as a key for registration. As hereinabove noted, such registration is necessary for proper functioning of the optical disc after label application. Importantly, this registration means is provided in the label itself by utilization of a specific central aperture perimeter.

In one embodiment of the present, the sheet perimeter has a contour corresponding to a contour of a optical disc perimeter and the label central aperture also has a contour corresponding to the sheet perimeter contour. However, it should be appreciated that the central aperture perimeter is not limited to this configuration.

In accordance with the present invention, a number of central aperture perimeter characteristics may be utilized in order to enable registration of the label with the optical disc. For example, the central aperture may be asymmetrical about the central axis or symmetrical about the axis with the label central aperture including at least one lobe or plurality of spaced apart lobes. The label central aperture perimeter may be non-circular and the lobed central aperture perimeter may be an asymmetric pattern about a central axis.

More specifically, the label may be sized and shaped for use with a business card CD-R with the central aperture features as hereinabove noted.

BRIEF DESCRIPTION OF THE DRAWINGS

The advantages and features of the present invention will be better understood by the following description when considered in conjunction with the accompanying drawings in which:

FIG. 1 is a top plan view of a business CD-R label in accordance with the present invention in which a sheet is provided with a perimeter having a contour corresponding to a contour of an optical disc perimeter (solid line) or perimeter different from the optical disc contour (broken line);

FIG. 2 is a top plan view of the label shown in FIG. 1 as properly positioned on a business card CD-R and registered therewith, the placement of the label being enabled by the label central aperture;

FIGS. 3–8 show plan views of alternative embodiments of the present label invention as they may be applied on business cards CD-R, each figure showing different central aperture perimeter with contours enabling registration of the label on the business card CD-R;

DETAILED DESCRIPTION

Figure 6:
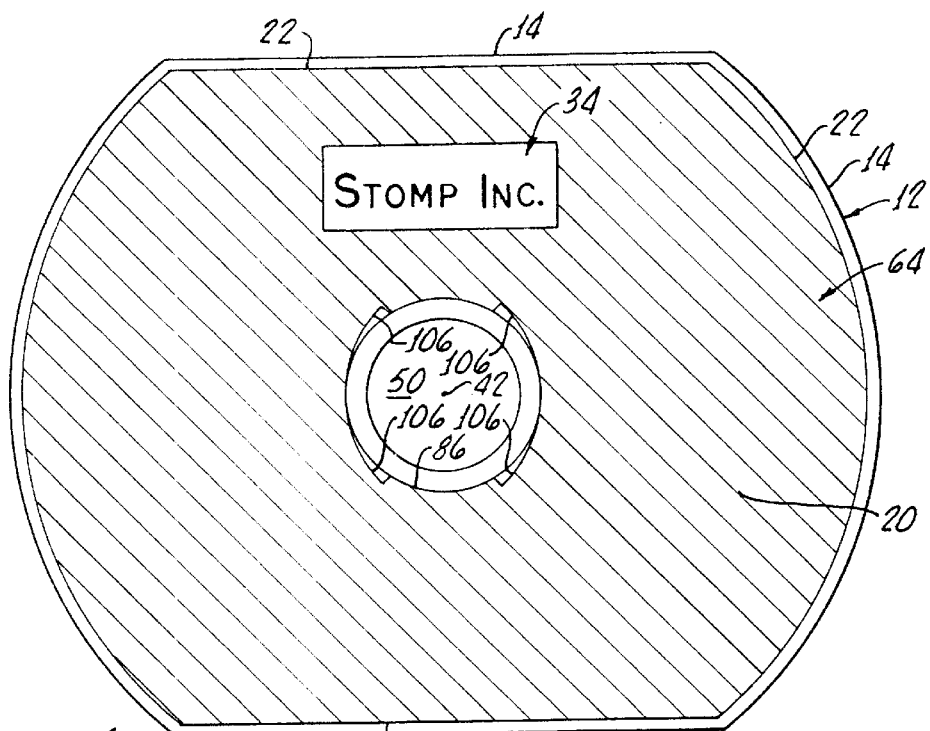
Figure 7:
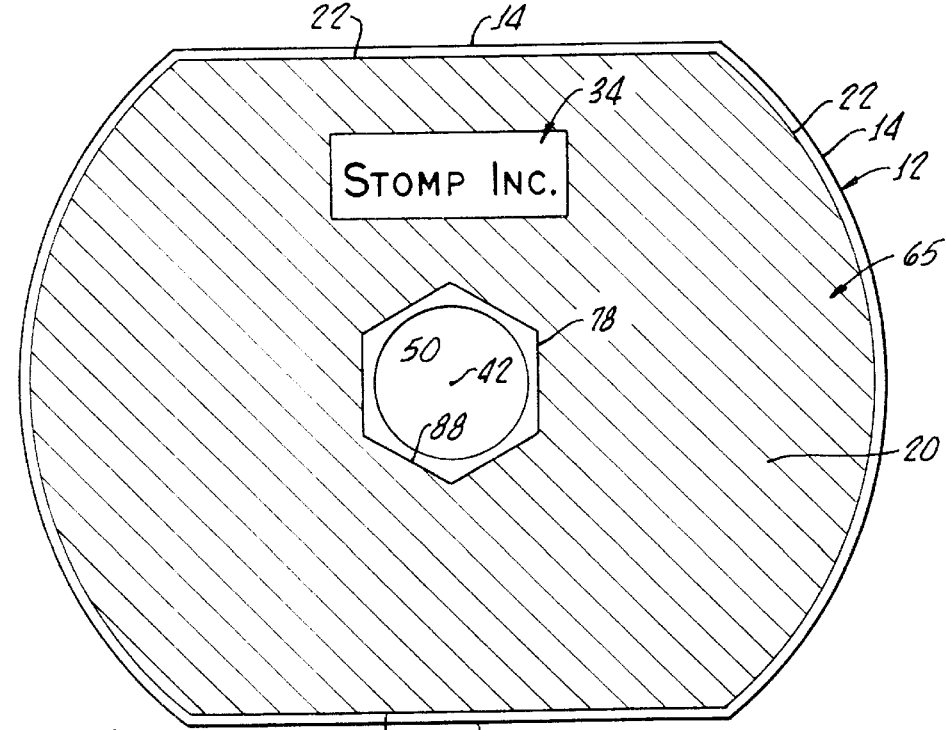
Figure 8:
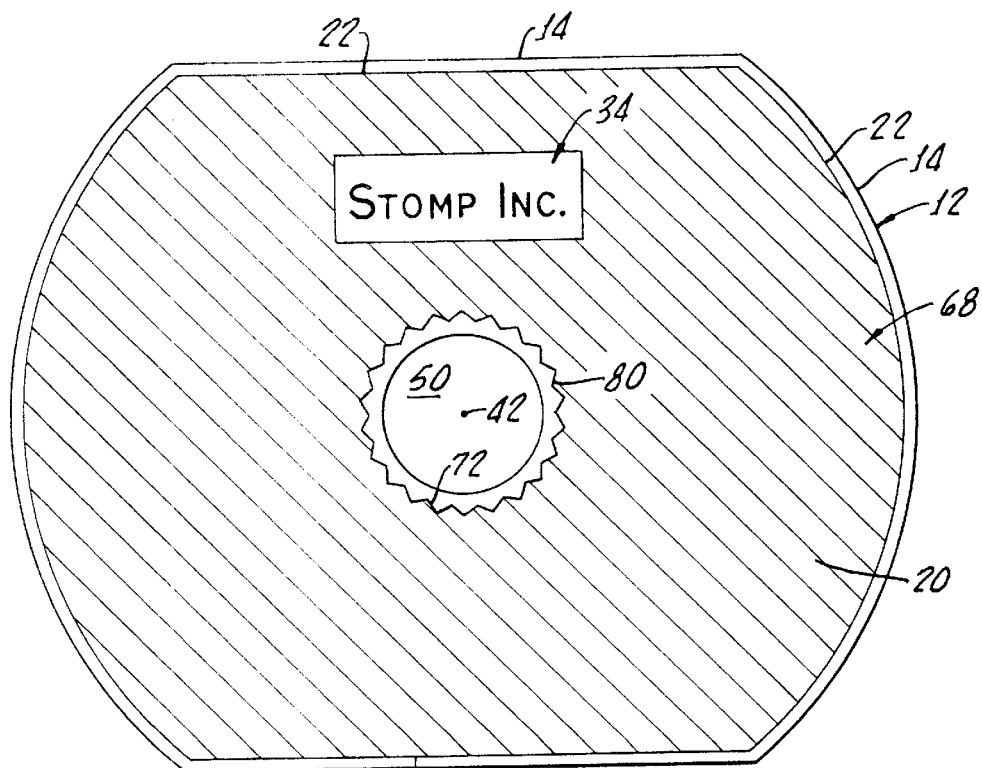

With reference to FIGS. 1–3, there is shown a label 10 in accordance with the present invention for an optical disc 12 (see FIG. 3) having a non-circular perimeter 14, the optical disc 12 preferably being a business card CD-R having a perimeter 14 shown in FIG. 3.

With reference again to FIGS. 1 and 2, the label 10 generally includes a sheet 20 having a non-circular perimeter 22. The sheet may be formed from any suitable stock material commonly used for labels as is well known in the art. An alternate perimeter 24, shown in broken line in FIG. 1 may, of course be utilized.

While a separate means attachment of the label 10 to the optical disc 12 may be utilized, preferably a pressure sensitive type adhesive 26 is disposed on one side 26 of the sheet 28. Any suitable adhesive 26 may be utilized and with the pressure sensitive adhesive 26 a silicone type release of layer, or backing, 30 should be utilized which is removed before application of the label 10 to the optical disc 12.

Typical dimensions of the label 10 are shown in FIG. 1 for use with the conventional business card CD-R 12 which may range from approximately 2.15 inches to approximately to 2.4 inches in width and approximately 3.03 inches to approximately 3.07 inches in length. Other dimensions may be utilized as needed.

The label 10, shown in shaded format in FIG. 3, is suitable for imprinting various indicia 34 thereof.

Importantly, label 10 includes a central aperture 38 having a perimeter 40 for enabling registration of the label 10 with the optical disc 12 as shown in FIG. 3. In effect the selected perimeter provides for keyed registration between the label 10 and disc 12. This provides for balanced rotation of the optical disc 12 with the label 10 fixed thereto about a disc axis 42. Such registration is shown in FIG. 3 in which the non-circular perimeter 22 of the label 10 is aligned with the non-circular perimeter 14 of the card 12 with a uniform margin 46 between the label perimeter 22 and card perimeter 14.

Keyed registration, enabled by the label central aperture perimeter 40 is performed through the use of a mandrel (not shown) which conforms to the label central aperture label 40 and guides the label 10 onto the disc 12 by engaging the disc aperture 50. The mandrel may be of any suitable type for supporting the label 10 and disc 12 in a manner enabling compression therebetween for fixing, by adhesion, the label 10 to the disc 12 in the registered pattern shown in FIG. 3. A suitable device for applying the label 10 to the disc, using a mandrel, is taught in U.S. Pat. No. 6,408,918 issued Jun. 25, 2002 entitled "OPTICAL DISC ADHESIVE LABEL APPLICATOR FOR NON-CIRCULAR OPTICAL DISC" and is incorporated herein, including all specifications and drawings, by this specific reference thereto.

It is clear that in the embodiment 10 shown in FIG. 3, the sheet perimeter 22 has a contour corresponding to a contour to the optical disc perimeter 14 and the label central aperture 38 has a contour corresponding to the sheet perimeter contour.

Referring to FIGS. 4–9, there is shown various label embodiments 60, 62, 64, 66, 68, 70 in accordance with the present invention as they may be fixed in a registered manner to the business card CD-R, 12 as hereinabove described. Common referenced characters in FIGS. 4–9 correspond to identical or substantially similar components as hereinbefore discussed and in connection with the embodiment 10 shown in FIGS. 1–3.

Each of the embodiments 60–68 includes a central aperture 72, 74, 76, 78, 80 respectively, which include perimeters 82, 84, 86, 88, 90, 92 for enabling registration of the label 60, 62, 64, 66, 68 respectively on the optical disc 12. The apertures 72–80 as shown in FIGS. 4–8 are symmetrical about the central axis 42.

In the embodiment 60 as shown in FIG. 4, the central aperture 82 includes at least one lobe 100 and preferably a plurality of lobes 100, 102.

The label 64 shown in FIG. 6 includes a plurality of lobes 106 disposed in a spaced apart relationship about the central axis perimeter 86. Each of the perimeters 82, 84, 86, 88, 90 and 92 enable the registration of the label 60, 62, 64, 66, 68 on the optical disc 12 through the use of appropriately shaped mandrel as hereinbefore described.

Figure 9:
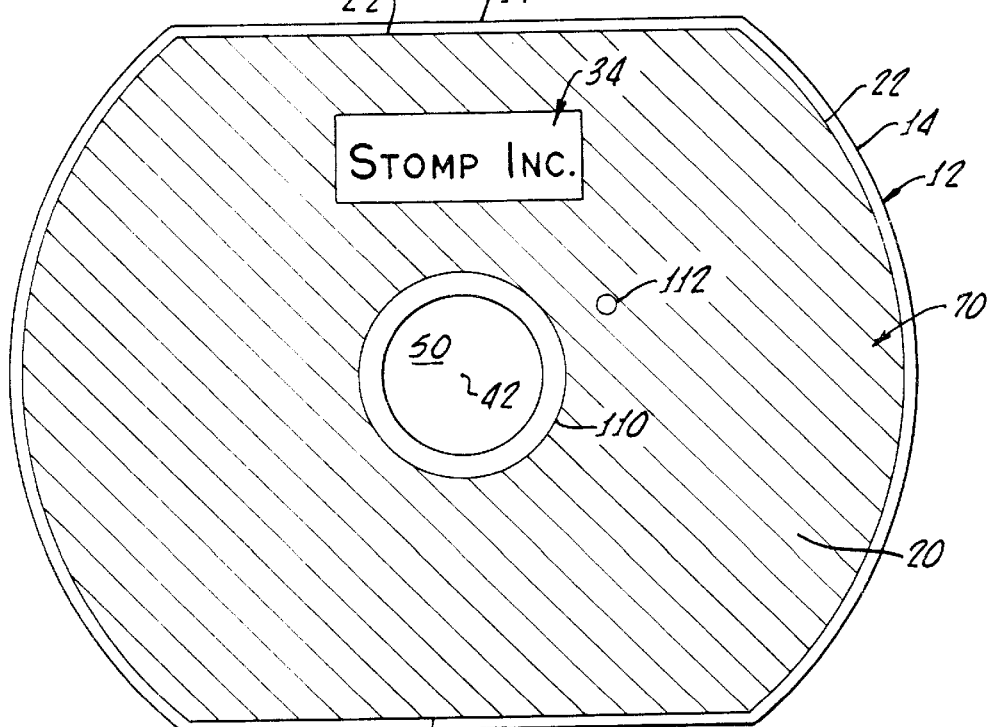
FIG. 9 shows a plan view of another embodiment of the present invention utilizing an asymmetric aperture for enabling registration of the label with a business card CD-R.

With reference to FIG. 9, there is shown the label 70 for the optical disc 20 which includes the sheet 20 having the non-circular perimeter 22 along with a generally circular central aperture 110. In this embodiment keyed registration is effected through the use of an asymmetric spaced apart aperture 112.

Figure 10:
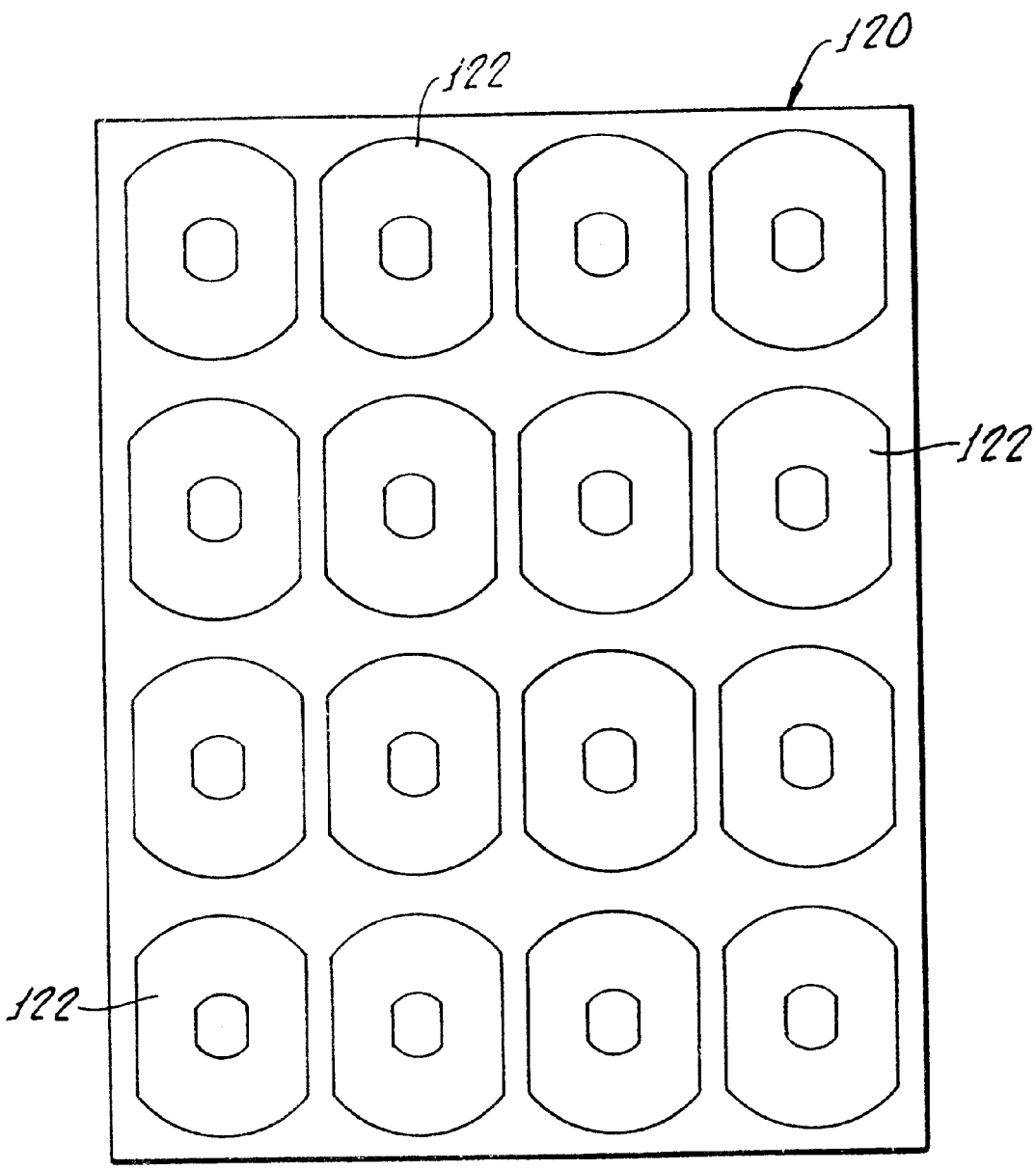
FIG. 10 shows a page of labels as may be removably adhered to a backing.

In another embodiments of the present invention shown in FIG. 10, a page 120 of labels 122 may be die cut and disposed on the backing 30 (see FIG. 2) by the adhesive 26, and removable therefrom by a silicone release layer, on shown, as is well known in the art. Each of the labels 122 are substantially similar to the label 10 shown in FIG. 1. It should be appreciated that various label perimeters 24, see FIG. 1, may be die cut and arranged on the page 120.

Although there has been hereinabove described a label for an optical disc having a non-circular perimeter in accordance with the present invention for the purposes of illustrating the manner in which the invention may be used to an advantage, it will be appreciated that the invention is not limited thereto. Accordingly, any and all modifications, variations, or equivalent arrangement which may occur to those skilled in the art should be considered within the scope of the present invention as defined in the appended claims.

What is claimed is:

1. A label for an optical disc having a non-circular perimeter, said label comprising:
    a sheet having a non-circular perimeter, the sheet non-circular perimeter having a contour corresponding to a contour of the optical disc perimeter;
    an adhesive for fixing said sheet to said optical disc; and
    a non-circular label central aperture means for registering said label with said optical disc with a non-circular mandrel, said mandrel oriented such that the disc non-circular perimeter is aligned with the sheet non-circular perimeter and said non-circular label central aperture corresponds with said non-circular mandrel.

2. The label according to claim 1 wherein the label central aperture has a contour corresponding to the sheet perimeter contour.

3. The label according to claim 1 wherein the label central aperture perimeter is asymmetric about a central axis.

4. The label according to claim 1 wherein the label central aperture perimeter is symmetric about a central axis.

5. The label according to claim 1 wherein the label central aperture perimeter includes at least one lobe.

6. The label according to claim 1 wherein said adhesive is disposed on one side of said sheet.

7. The label according to claim 1 wherein the label central aperture perimeter includes a plurality of spaced apart lobes.

8. The label according to claim 7 wherein the lobed central aperture has a symmetric pattern about a central axis.

9. The label according to claim 7 wherein the lobed central aperture perimeter has an asymmetric pattern about a central axis.

10. A label for a business card CD-R having a non-circular perimeter said label comprising:
    a sheet having a non-circular perimeter, the sheet non-circular perimeter having a contour corresponding to a contour of the card;
    an adhesive for fixing said sheet to the card;

a non-circular label central aperture means for registering said label with said card with a non-circular mandrel in order to provide balanced rotation of the card, said mandrel oriented such that the card non-circular perimeter is aligned with the sheet non-circular perimeter and said non-circular label central aperture corresponds with said non-circular mandrel.

11. The label according to claim 10 wherein the,label central aperture has a contour corresponding to the sheet perimeter contour.

12. The label according to claim 10 wherein the sheet perimeter has a different contour than a contour of the optical disc.

13. The label according to claim 10 wherein the label central aperture perimeter is symmetric about a central axis.

14. The label according to claim 10 wherein the label central aperture perimeter includes at least one lobe.

15. The label according to claim 10 wherein said adhesive is disposed on one side of said sheet.

16. The label according to claim 10 wherein the label central aperture perimeter includes a plurality of spaced apart lobes.

17. The label according to claim 16 wherein the lobed central aperture has an asymmetric pattern about a central axis.

18. The label according to claim 16 wherein the lobed central aperture has a symmetric pattern about a central axis.

19. A page of labels for an optical disc having a non-circular perimeter, the page comprising:

a backing; and a plurality of labels removably adhered to said backing, each label comprising:

a sheet having a non-circular perimeter, the sheet non-circular perimeter having a contour corresponds to a contour of the optical disc perimeter;

an adhesive disposed on one side of said sheet; and non-circular label central aperture means for registering said label with said optical disc with a non-circular mandrel, said mandrel oriented such that the disc non-circular perimeter is aligned with the sheet non-circular perimeter and said non-circular label central aperture corresponds with said non-circular mandrel.

* * * * *